United States Patent [19]

Heathcote et al.

[11] Patent Number: 4,498,043
[45] Date of Patent: Feb. 5, 1985

[54] PROBES FOR MEASURING APPARATUS

[75] Inventors: Geoffrey L. Heathcote, Cropston; Alan C. Hollowell, Rothwell, both of England

[73] Assignee: The Rank Organisation Limited, London, England

[21] Appl. No.: 391,350

[22] Filed: Jun. 23, 1982

[30] Foreign Application Priority Data

Jun. 23, 1981 [GB] United Kingdom ............... 8119369

[51] Int. Cl.³ ............................................. G01R 27/26
[52] U.S. Cl. ............................ 324/61 P; 340/870.37; 200/DIG. 1
[58] Field of Search ........................ 324/61 P, 61 R; 361/181; 73/104; 340/870.37; 200/DIG. 1

[56] References Cited

U.S. PATENT DOCUMENTS

| | | | |
|---|---|---|---|
| 2,510,822 | 6/1950 | Jacot et al. | 324/61 P |
| 3,249,833 | 5/1966 | Vosteen | 324/61 R X |
| 3,696,908 | 10/1972 | Gluck et al. | 200/DIG. 1 |
| 3,948,359 | 4/1976 | Rogers | 324/61 R X |
| 4,096,758 | 6/1978 | Moore | 324/61 R X |
| 4,211,935 | 7/1980 | Erben | 361/181 X |
| 4,288,836 | 9/1981 | Thornburg et al. | 200/DIG. 1 |
| 4,294,321 | 10/1981 | Wittlinger et al. | 324/61 R |
| 4,364,047 | 12/1982 | Archer | 340/870.37 |
| 4,374,383 | 2/1983 | Polk et al. | 340/870.37 |

Primary Examiner—Stanley T. Krawczewicz
Attorney, Agent, or Firm—Brisebois & Kruger

[57] ABSTRACT

A contact sensitive probe, especially for coordinate measuring apparatus, comprising a housing having seatings defining a stable rest position for a stylus member projecting from the housing to terminate at a sensing tip, together with a spring for urging the stylus member toward the stable rest position to effect relocation thereof after displacement due to contact of the tip with the test surface, wherein displacement of the stylus member is detected by a capacitative transducer having one plate carried by the housing and one plate carried by the stylus member, said transducer being connected to a circuit means adapted to produce an output signal indicative of a change in capacitance.

8 Claims, 5 Drawing Figures

4,498,043

PROBES FOR MEASURING APPARATUS

FIELD OF THE INVENTION

This invention relates to a probe for use in measuring apparatus, more especially three dimensional coordinate measuring apparatus. In such apparatus, the probe determines the point in space at which contact is established between a stylus and a test surface. One alternative use of such a probe is in a setting gauge.

PRIOR ART

Such probes are known, for example from U.K. Specifications No. 1,445,977 and No. 1,447,613. In each of these known probes, a stylus member is kinematically located relative to a support to establish a circuit path through a pair of contacts, one on the support and one on the stylus member. In practice, three such pairs of contacts define the kinematic location or stable rest position. When the stylus member is displaced from its kinematic location due to contact of the tip of the stylus member with the test surface, at least one contact pair is opened to initiate an electrical signal which indicates that such contact has occurred.

In another arrangement, disclosed in U.K. Patent Publication No. 2,025,073, detection is effected through an inductive coupling which couples an oscillator powered driving circuit with a driven circuit completed by the contacts of the kinematic location. The reaction on the driving circuit through the inductive coupling is measured to determine opening of the contacts. This known arrangement avoids the requirement for an independent power supply in the driven circuit; nevertheless there is still a flow of current in such circuit when the contacts are closed.

In general, therefore, the prior art relies for detection of stylus contact on the use of the kinematic location as an electric switch.

OBJECT OF THE INVENTION

It is an object of this invention to provide an improved probe for use in measuring apparatus.

BRIEF SUMMARY OF THE INVENTION

In accordance with the present invention, there is provided a probe comprising a support, a stylus member having a sensing tip, means on the support defining a kinematic location or stable rest position for the stylus member, means urging the stylus member against said kinematic location to effect relocation thereof after displacement due to contact of the tip with a test surface, a capacitative transducer having one part carried by the support and one part carried by the stylus member, and circuit means connected to said transducer to detect a change in capacitance due to displacement of the stylus member relative to the support.

ADVANTAGES OF THE INVENTION

It is a major disadvantage of the known probes that electric current flows through the kinematic location. This can sometimes lead to uncertainties in detection, especially as the probe ages with use. In the probe of the present invention, electrical current does not flow through the kinematic location. Problems of uncertainty in the opening of a contact pair, for example due to wear, corrosion and ingress of dust or dirt, do not arise.

In addition, in the probe of the present invention, detection and relocation of the stylus member can be more accurate due to their relative independence.

BRIEF DESCRIPTION OF DRAWINGS

Practical embodiments of the present invention are now described by way of example with reference to the accompanying drawings, in which.

DESCRIPTION OF EMBODIMENTS

Figure 1:
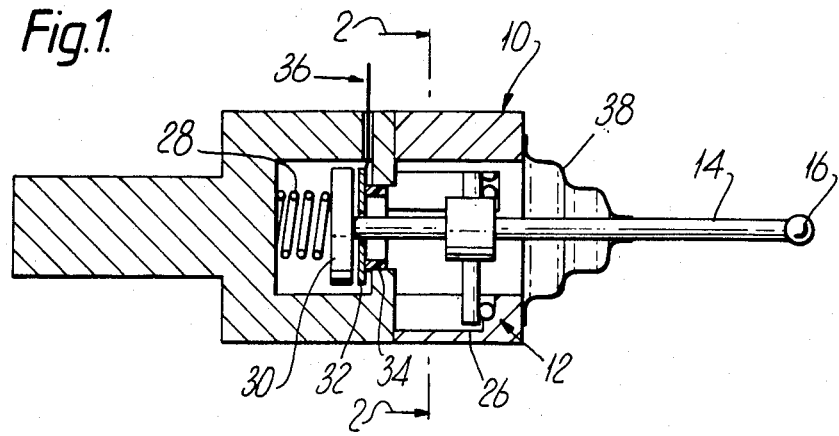
FIG. 1 shows one embodiment of probe in longitudinal cross-section.
Figure 2:
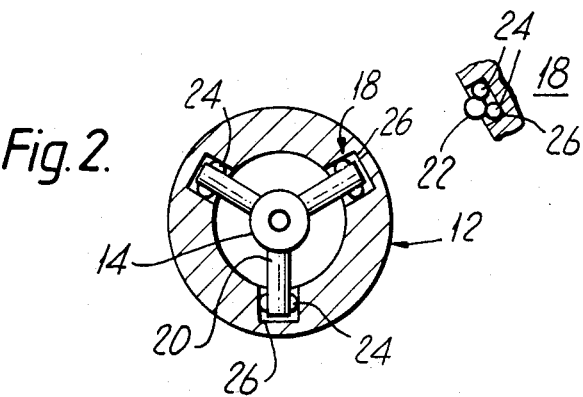
FIG. 2 is a transverse cross-section on the line 2—2 of FIG. 1.

The probe shown in FIGS. 1 and 2 comprises a housing 10 which may be mounted, for example, in coordinate measuring apparatus.

The housing 10 has a kinematic location 12 for a stylus member 14 having a spherical sensing tip 16.

The kinematic location 12 which defines a stable rest position is most clearly shown in FIG. 2, and comprises three seatings 18 at 120 degrees angular spacings. Three transverse arms 20 consisting of rollers are provided on the stylus member 14 each engaging a pair of balls 24 fixed within the recesses 26 in the housing 10. This type of kinematic location provides lateral constraint in one direction.

When in use the tip 16 contacts the test surface (not shown), the stylus member 14 is displaced, at least in part longitudinally, and the kinematic location is broken at one or more of the seatings 18. Relocation of the stylus member 14 to its stable rest position against its kinematic seatings 18 is achieved by means of a biasing spring 28 acting between the housing 10 and the stylus member. Displacement of the stylus member 14 takes place against the biasing action of this spring.

For detection contact of the tip 16 with the test surface, a capacitative transducer is provided. One capacitor plate 30 is carried by the stylus member 14 and the other capacitor plate 32 is carried by the housing 10. The plate 30 is mounted directly to the inner end of the stylus member 14, and serves as an abutment for the spring 28. The plate 32 is mounted to the housing through the intermediary of an electrically insulating ring 34.

When the stylus member 14 is displaced, the capacitance defined by the transducer plates 30, 32 is changed, and this change is detected by a circuit to which the transducer is connected through lead-out 36.

Conveniently, the housing 10 is a housing sealed to prevent ingress of dirt and moisture, to which end a flexible seal 38 is provided between the housing and the projecting end portion of the stylus member 14 carrying the sensing tip 16.

The housing 10 may be filled with oil to increase the sensitivity of the transducer and to ensure that it operates in a stable enviroment. Such oil can also serve to lubricate the kinematic location 12 and to dampen mechanical vibrations, thus preventing false readings.

It should also be mentioned that all parts of the probe, but especially the capacitative transducer, are desirably made of high form stability materials in order to reduce thermal drift which can be detrimental to the high resolution required.

It may sometimes be advantageous, especially for a very high degree of accuracy and repeatability, to combine a part of the capacitative transducer with the kinematic location. Such a modified arrangement is shown in FIG. 3, wherein the same reference numbers are employed for similar parts.

Figure 3:
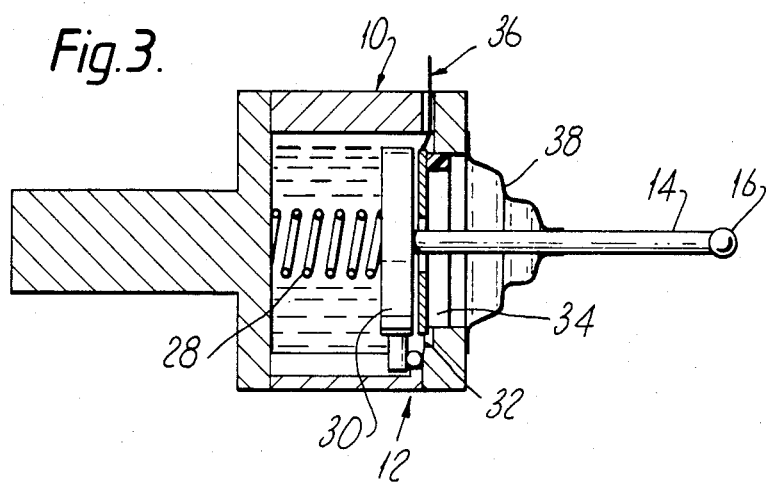
FIG. 3 shows a modified embodiment in longitudinal cross-section.

In the arrangement of FIG. 3, it will be seen that the capacitor plate 30 carries the transverse arms 20 carrying the rollers and balls for the kinematic location 12.

Another modified arrangement is shown in FIG. 4, where again the same reference numerals are employed for similar parts.

Figure 4:
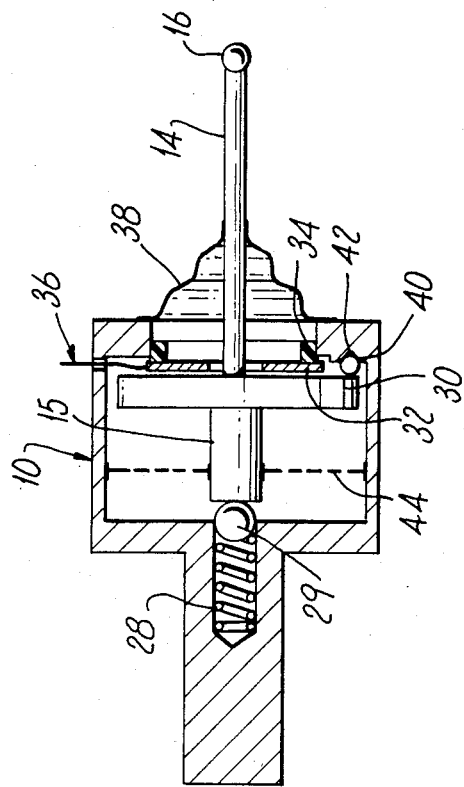
FIG. 4 shows another modified embodiment in longitudinal cross-section.

In the arrangement of FIG. 4, the capacitor plate 30 seats against three equi-angularly spaced balls 40 secured in V-recesses 42 in the bottom of the housing 10. Inner of the capacitor plate 30, the stylus member 14 includes a thick inner end portion 15 acted upon through a ball 29 by the biasing spring 28. A flexible diaphragm 44 is mounted between the housing 10 and the inner end portion 15 of the stylus member 14. This type of mechanical relocation system comprising diaphragm and three point contact allows three degrees of movement for the stylus member 14 whilst maintaining radial constraint.

Figure 5:
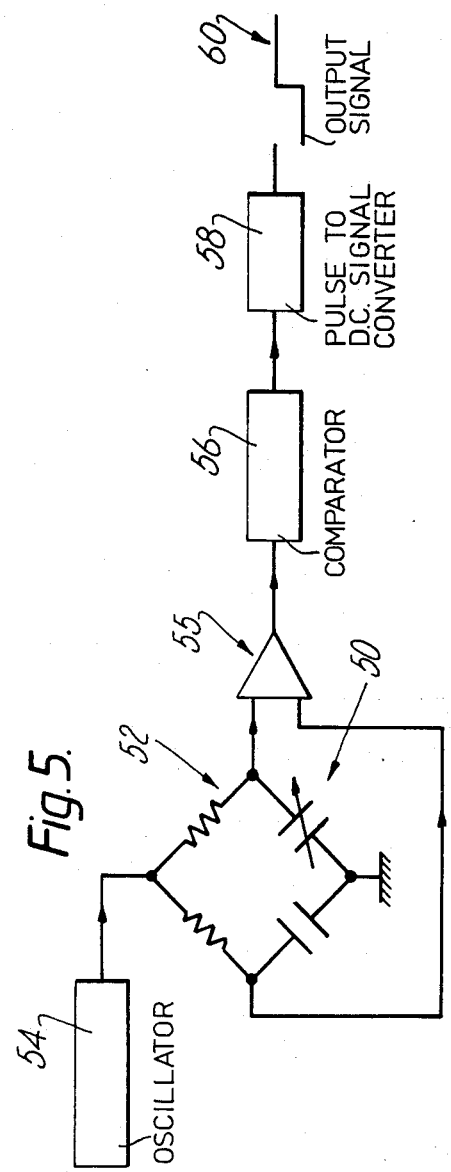
FIG. 5 is a simplified diagram of a probe drive circuit.

FIG. 5 shows, in simplified form, an electronic drive circuit for the probe with capacitative transducer, as already exemplified with reference to FIGS. 1 to 4.

The capacitative transducer 50 (formed by capacitor plates 30, 32) is incorporated in a bridge circuit 52 fed by an alternating current signal from an oscillator 54. When the capacitance of the transducer 50 changes, the oscillator signal is amplitude modulated (or the amplitude of modulation is altered).

The output of the bridge circuit 52 is amplified at 55 and fed to a comparator 56 at which the level of the modulation signal is detected with respect to a predetermined d.c. voltage.

When an alteration in the amplitude of the modulated signal occurs due to movement of the stylus member responsive to contact of the sensing tip with the test surface, the comparator 56 is switched at a rate governed by the operating frequency of the oscillator 54. A logic circuit 58 detects the train of pulses output from the comparator 56 and produces a d.c. level output signal 60, indicating that the tip has made contact with the test surface.

Various modifications of the above-described embodiments are possible within the scope of the invention as defined by the appended claims. In particular, numerous changes of the mechanical mountings may be made whilst retaining a capacitative transducer having two parts respectively carried by the relatively displaceable housing or support and the stylus member, and many other circuit arrangements may be devised for detecting a change in the capacitance of the transducer.

We claim:

1. Measuring apparatus for detecting at what point in space contact is established between a stylus and a test surface of an object, said apparatus comprising a probe comprising a support, a stylus member having a sensing tip, three spaced seatings on the support defining a stable rest position for the stylus member, means normally urging the stylus member toward said seatings and into said stable rest position, the stylus member being displaced from said stable rest position when the stylus contacts the test surface of the object and being relocated into said stable rest position when contact with the object is broken, a capacitative transducer having a first part carried by the support and a second part carried by the stylus member, and a detector circuit connected to said transducer to detect a change in capacitance due to displacement of the stylus member out of its stable rest position.

2. Measuring apparatus according to claim 1 wherein the support comprises a housing and said location means and said capacitative transducer are within the housing.

3. Measuring apparatus according to claim 2 wherein said housing has a flexible seal through which projects the portion of the stylus member having a tip.

4. Measuring apparatus according to claim 3 wherein the housing is filled with oil.

5. Measuring apparatus according to claim 1 wherein the second part of the capacitative transducer carried by the stylus member seats on said three seatings, in said stable rest position of the stylus.

6. Measuring apparatus according to claim 1 further comprising a diaphragm providing radial constraint of the stylus member.

7. Measuring apparatus according to claim 1 wherein said circuit means includes an electrical bridge with said capacitative transducer connected in one arm of the bridge.

8. Measuring apparatus according to claim 7 wherein said circuit means comprises an oscillator providing an alternating current signal to the bridge, which signal is amplitude modulated at the bridge with a modulation amplitude dependent on the capacitance of the transducer, a comparator for level detection of the modulated signal, which comparator is switched at a rate governed by the frequency of the oscillator when the modulated signal level exceeds a predetermined threshold, and a logic circuit detecting the train of pulses output from the comparator to provide an output signal indicative of the displacement of the stylus member from its stable rest position.

* * * * *